United States Patent Office 2,871,431
Patented Jan. 27, 1959

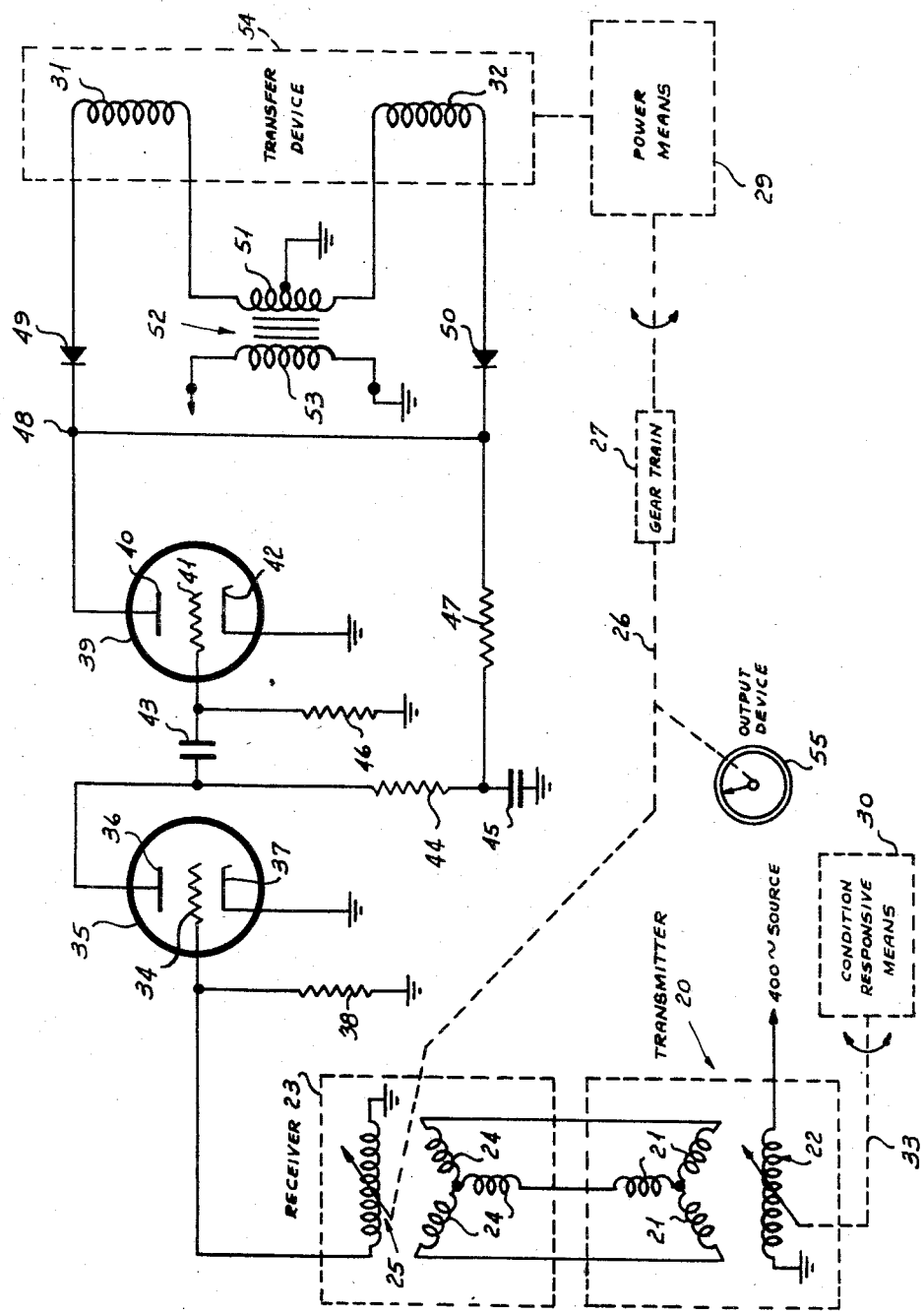

2,871,431

SERVOSYSTEM WITH PREAMPLIFIER

James E. Brook, Hackensack, N. J., assignor to Bendix Aviation Corporation, Teterboro, N. J., a corporation of Delaware Application February 24, 1955, Serial No. 490,362

10 Claims. (Cl. 318—30)

This invention pertains to a servo system and more particularly to means for providing a servo amplifier with an ancillary source of direct current which may be used to feed a pre-amplifier of the system.

The present invention is an improvement of my copending application for a Servo System, Serial No. 465,778, now Patent No. 2,802,976 issued August 13, 1957, the assignee of said application being the same as the assignee of the present application, and wherein a novel servo amplifier employs a single current control element which is connected to divide switching means and the balanced control windings of a transfer device. The transfer device utilizes balanced windings which are energized by a source of alternating current, with the control windings being connected through a pair of diodes to provide a pulsating direct current and connected to the plate of a triode, or current control element.

Due to the phasing of the excitation voltages and the switching action of the diodes, the current control element operates alternately in time on each control winding, whereby the current control element is time-shared between the two control windings. The control signal is a voltage of the carrier frequency that is in phase with the excitation voltage. The presence of a control signal will result in an increase in average current through one control winding and an equal decrease in current through the other control winding, thereby providing a differential flow of current through the control windings of a transfer device which is used to control the operation of a power means, such as a motor or a hydraulic amplifier servovalve. When no control signal exists, the quiescent currents at each control winding will be equal and the motor or other power means will be at rest.

It is an object of the present invention to provide a servo system employing a pre-amplifier having a novel ancillary source of direct current.

A further object is to provide a novel ancillary direct current supply for a pre-amplifier from a discriminator portion of a servo amplifier.

Another object of the invention is to provide a novel servo system employing a single current control element coupled to a discriminator and wherein a small quantity of the energy coupled to the current control element is passed through a decoupling network to provide plate voltage for a pre-amplifier.

A further object of the invention is to provide a novel servo system utilizing a pre-amplifier operatively coupled to a current control element and a discriminator and wherein a portion of the direct current supplied by the discriminator is fed through a filter network to supply operating voltage for the pre-amplifier.

Another object of the invention is to provide a novel servo system employing a discriminator wherein, in essence, a full wave rectifier operates into a resistive load constituted by the current control element, and wherein a small quantity of the direct current across the control element is provided as an ancillary B plus (B+) supply for a pre-amplifier.

A further object is to provide a novel power amplifier having control windings coupled with a single impedance current control means, and wherein a small quantity of direct current of the power amplifier is fed through a decoupling network to supply direct current for a pre-amplifier.

Another object is to provide a novel servo amplifier having a pre-amplifier portion thereof with direct current fed from an ancillary source provided by a decoupling network connected within said amplifier, and wherein said ancillary source of direct current is provided by means which utilizes a minimum of parts, and wherein said ancillary source is efficient, reliable, and robust.

The present invention contemplates a servo amplifier which utilizes a triode as a single current control element which is connected to a common point of like elements of a pair of diodes with each of the remaining elements of said diodes being connected to control windings of a transfer device, and with the remaining ends of said control windings being connected to a source of excitation. The diodes, which act as switching means, provide full wave direct current at their common point. A small quantity of the direct current provided at said common point is connected through a decoupling network for supplying sufficient direct current to the plate of a vacuum tube pre-amplifier via a plate load. The full wave direct current voltage of plus polarity with respect to ground exists, incidentally, at the plate of the control triode, and said voltage is actually a by-product of the functioning of the discriminator. A small quantity of the direct current is utilized to a practical advantage by passing said quantity through a filter network so that a B plus (B+) voltage is derived as an ancillary source of unidirectional voltage without the necessity of providing a separate full wave rectifier for said pre-amplifier.

The foregoing and other objects and advantages of the invention will appear more fully hereinafter from a consideration of the detailed description which follows, taken together with the accompanying drawing wherein one embodiment of the invention is illustrated by way of example. It is to be be expressly understood, however, that the drawing is for illustration purposes only and not to be construed as defining the limits of the invention.

In the drawings:

The single figure of the drawing shows a position servo employing an amplifier utilizing a single current control element with a network for supplying an ancillary source of direct current for a pre-amplifier.

Referring to the drawing, there is shown a schematic diagram of a position servo having a transmitter inductive device 20 with stator windings 21 and a rotor 22 having a winding, with said rotor being mechanically coupled via a shaft 33 to an input control or condition responsive means 30, for angularly positioning the rotor 22 relative to the stator windings 21. A receiver inductive device 23 has its stator windings 24 connected to the stator windings 21 of the transmitter 20 in a conventional manner. The rotor 25 of the receiver inductive device has its shaft 26 coupled through a gear train 27 to the movable member of a power means 29, and an output device 55 which may be an indicator. The shaft 26 drives the receiver to null in accordance with the control signal of the system.

In the aforementioned Brook application the power means is shown as a reversible motor having its variable phase winding energized by the output windings of a magnetic amplifier. However, the power means may be a hydraulic amplifier servovalve, and the control windings 31 and 32 may be actually located within the hydraulic amplifier servovalve.

The winding of the rotor 22 has one end connected to ground with the other end connected to a source of alternating current, and in the present case is represented as being of 400 cycles. The winding of the rotor 25 of the receiver 23 has one end thereof connected to ground with the other end thereof connected to the grid 34 of a pre-amplifier tube 35 which has a plate 36 and a cathode 37, said cathode being connected to ground. A grid return resistor 38 is connected from the grid 34 to ground. A current control element 39 is represented as being a triode having a plate 40, a grid 41, and a cathode 42 connected to ground. The plate 36 of tube 35 is connected through a coupling condenser 43 to the grid 41 of the current control element 39. A plate load resistor 44 has one end thereof connected to the plate 36 of tube 35 with the other end thereof being connected to one side of a capacitor 45, and with the opposite side of said capacitor being connected to ground. A grid resistor 46 has one end thereof connected to the grid 41 of the tube 39, while the other end of said resistor is connected to ground. A resistor 47 has one end thereof connected at a point between the resistor 44 and the capacitor 45, while the other end of said resistor is connected to a common point 48. A pair of diode rectifiers 49 and 50 have their cathodes connected together and to the common point 48 which is also connected to the plate 40 of the current control element or tube 39. The plates of said rectifiers are each connected, respectively, to one end of the control windings 31 and 32. The opposite ends of said control windings are connected to the outer terminals of the secondary winding 51 of a transformer 52, which transformer has a primary winding 53 which is connected to the 400 cycle source of alternating current. The mid-tap of the secondary winding 51 is connected to ground.

The control windings are shown in a block indicated by legend as a Transfer Device 54. In the aforementioned patent application of James Brook, the transfer device is represented as being a magnetic amplifier, including excitation windings and output windings, with said output windings being connected in a conventional manner to the variable phase winding of a reversible motor. However, it is to be understood that the transfer device may assume any form, such as a magnetic amplifier, which will have its output coupled to any suitable power means, such as the reversible motor. However, the power means may be a pressure follower hydraulic amplifier servovalve and the control windings may be a part of the power means per se.

The switching means or diodes 49 and 50, when coupled with the control windings and the secondary 51 of the transformer, are connected with the plate 40 of the current control element 39. The secondary winding 51 supplies alternating current to the diodes or switching means, so that either one or the other of said diodes will conduct depending on the instantaneous polarity of the alternating current supplied by winding 51. With this arrangement, it will be seen that the resistive load constituted by the current control element 39 will have provided at the common point 48 a pulsating direct current.

At a signal condition the current control element provides a differential current in the control winding to control the operation of the power means.

Resistance coupling is used for coupling the pre-amplifier tube 35 with the current control element 39. Resistor 47 and capacitor 45 provide a decoupling network whereby a small quantity of the pulsating direct current supplied at the common point 48 is fed through the plate load resistor 44 to supply sufficient direct current to the plate of the pre-amplifier tube 35 to permit proper operation of the system.

Said decoupling network provides a filter for supplying the B plus (B+) voltage for the pre-amplifier. The current supplied to the tube 35, from the current supplied at point 48 for the current control element 39, is so small that it does not impair the operation of the discriminator, yet is sufficient to supply the required B plus (B+) voltage for suitable operation of the pre-amplifier.

Variations in the current flow through the current control element cannot unbalance the currents in the control windings, which unbalance would thereby produce a spurious output voltage when the input is grounded. Deterioration of the current control element over long periods of time may shift the value of the quiescent current, but this will not appreciably affect the operation of the magnetic amplifier portion of the invention since any variation in current through the current control element will be reflected equally in each control winding.

The winding of rotor 22 and the winding 53 of transformer 52 may be energized from the same source. The voltage applied to plate 40 of tube 39 is a pulsating D. C. voltage and the signal applied to grid 41 of tube 39 is an alternating voltage. During the half cycle, when the grid signal is in phase with the plate voltage, more current flows through tube 39 than during the half cycle when the grid signal is of opposite phase to the plate voltage and the current in one control winding of the transfer device increases, while the current in the other control winding decreases, as determined by the phase of the signal, thereby providing a differential current in said control windings for operation of the power means. The rotor of the motor of the power means is driven in one direction or the other depending on the phase sense of the control signal, or causing actuation of the servovalve in a hydraulic amplifier to move in one direction or the other. When no control signal exists, the quiescent current in each control winding will be equal, and the rotor of the motor or other movable member of the power means will be at rest.

Operation of the condition responsive means 30 will produce a signal in the winding of rotor 22 which will result in an error signal being transmitted from the transmitter 20 to the receiver 23, so that the error signal is picked up by the winding of the rotor 25 and impressed on the grid 34 of the pre-amplifier tube 35. After the signal is amplified in the pre-amplifier, it is fed to the grid 41 of the current control element 39 to produce a differential current flow in the control windings. In some instances, the transfer device may be a magnetic amplifier as shown in the aforementioned application of James Brook. In the event the control windings 31 and 32 are part of a magnetic amplifier, the output of the amplifier will cause actuation of the power means which operates through a gear train, thereby causing angular rotation of the shaft 36 in the proper direction. Rotation of shaft 26 will rotate the rotor 25 until it is in positional agreement with the rotor 22 of the transmitter, and will also actuate the indicator or output device 55 accordingly. The amplifier of the servo system includes a phase sensitive discriminator and is therefore responsive only to the in-phase component of the control signal.

From the foregoing, it will be seen that the servo amplifier comprises a pre-amplifier, a discriminator which includes the current control element, a pair of diode switches, and the load or control windings of a transfer device, which load may be the control windings of a hydraulic valve. The servo amplifier also includes said transfer device which may be a magnetic amplifier or other suitable means utilizing load control windings for the differential current produced in the load, which differential current is ultimately used to actuate a power means. The discriminator of the device discriminates as to phase and amplitude of the control signal.

The control signal is the same frequency as the excitation supplied to the control windings, and said control signal is either in phase or 180° out of phase with the reference or excitation voltage supplied to the control windings. The direction sense of the system is related to the phase of the error or control signal.

At zero signal condition the current control element acts as a quiescent impedance element and conducts full wave rectified current from plate to cathode to ground in the current control element 39. At a signal condition, depending on the phase sense of the control signal, the average current in one control winding will rise, while the average current in the other control winding will fall an equal amount.

The decoupling network utilizes a small quantity of the pulsating direct current which is incidentally present in the system due to the inherent nature of the discriminator. Consequently, while full wave rectification is provided by the discriminator and is in the circuit of the servo amplifier, a small quantity of the direct current is fed through the filter or decoupling network and supplies suitable plate voltage for operation of the pre-amplifier.

The control winding quiescent currents are equal at a no signal condition, it being understood that these currents are produced by the excitation voltages. When a signal is applied to the control grid of the single impedance current control means, the currents in the control windings are unbalanced symmetrically, that is, the current in one control winding increases equally as the current in the other control winding decreases depending on the amplitude of the in-phase component of the signal.

Although but a single embodiment of the invention has been illustrated and described in detail, it is to be expressly understood that the invention is not limited thereto. Various changes may also be made in the design and arrangement of the parts without departing from the spirit and scope of the invention as the same will now be seen by those skilled in the art.

What is claimed is:

1. In a position servo employing inductive transmitting and receiving devices and including a magnetic amplifier having cores with excitation, control and output windings operatively connected in a balanced arrangement, switching means connected to said control windings and having a common terminal, current control means having at least a plate connected to said switching means by way of said common terminal to provide energization of said control windings, whereby a pulsating direct current is provided across said plate and ground, a pre-amplifier having at least a plate coupled to the input of said current control means, and a filter network connected to said common terminal and said pre-amplifier plate to supply a D. C. plate voltage for said pre-amplifier.

2. In a position servo employing inductive transmitting and receiving devices and including a magnetic amplifier having cores with control and output windings operatively connected in a balanced arrangement, diode switching means connected to said control windings and having a common terminal, a source of alternating current connected to said control windings, a single impedance current control means connected to said switching means by way of said common terminal having a pulsating direct current applied thereto, a pre-amplifier, and filter means connecting said pre-amplifier to said common terminal to supply direct current voltage to the output of said pre-amplifier.

3. In a position servo employing inductive transmitting and receiving devices and including a magnetic amplifier with cores having control and output windings operatively connected in a balanced arrangement, diode switching means connected to said control windings and having a common terminal, a single impedance current control means connected to said switching means by way of said common terminal, a source of alternating current connected to said control windings for providing pulsating direct current at said common terminal, a pre-amplifier having its output connected to the input of said current control means, and filter means connecting said common terminal to said pre-amplifier output to supply a direct current voltage to said pre-amplifier output.

4. In a servo amplifier having a discriminator portion energized by a source of alternating current to control operation of a transfer device having balanced windings connected through a pair of diodes to provide a pulsating direct current at a common terminal of said diodes, a current control element having a plate, a grid and a cathode, with said plate being connected to said common terminal and said cathode being connected to ground, a pre-amplifier having a plate, and an input grid connectable to a signal source, last said plate being coupled to the grid of said current control means, and a filter connected between said common terminal and the plate of said pre-amplifier, whereby a small quantity of said pulsating direct current provides D. C. plate voltage for said pre-amplifier.

5. In a power amplifier having a discriminator portion energized by a source of alternating current to control operation of a transfer device having balanced windings connected through a pair of diodes to provide a pulsating direct current at a common terminal of said diodes when said common terminal is connected to ground via the cathode of a current control element also having a plate and a grid, with said plate being connected to said common terminal, a pre-amplifier having an input grid connected to a signal source, and a plate coupled to the grid of said current control means, and a filter network connecting said common terminal to the plate of said pre-amplifier to provide direct current voltage to said pre-amplifier.

6. In a power amplifier as set forth in claim 5 wherein said filter network includes a resistor and a capacitor connected in series between said common terminal and ground, and a load resistor is connected from a point between said resistor and capacitor to said pre-amplifier plate.

7. In a position servo employing inductive transmitting and receiving devices and including an amplifier employing a single current control element connected to switching means and the control windings of a transfer device energized by an alternating current of predetermined frequency and wherein at a common terminal of said switching means there exists a pulsating direct current, a pre-amplifier having at least a plate and a grid, said grid being connected to an output of said inductive receiving device, and said plate being connected to an input of said current control means, and a filter network connected between said common terminal and the plate of said pre-amplifier whereby a direct current voltage is applied to said plate.

8. In a position servo employing inductive transmitting and receiving devices and including a power amplifier employing a current control element connected to switching means and the control windings of a transfer device energized by an alternating current of predetermined frequency and wherein at a common terminal of said switching means there exists a pulsating direct current, a pre-amplifier having its output connected to the input of said current control element, and a filter connected between said common terminal and said pre-amplifier output, whereby a direct current voltage is supplied as a plate supply voltage to said pre-amplifier.

9. In a position servo as set forth in claim 8, where in said switching means is a pair of diodes.

10. A signal network comprising a discriminator including balanced load elements energized by an alternating power source, a pair of rectifiers connected to said load elements and to one another and providing a pulsating D. C. voltage, current control means having an output connected to said rectifiers and energized by the pulsating D. C. voltage, a pre-amplifier having an input adapted to receive an A. C. signal of the same frequency as said source and having an output connected to an input of said current control means, and a filter network connected to said rectifiers and to the output of said pre-amplifier and providing a D. C. voltage to the output of said pre-amplifier.

References Cited in the file of this patent

UNITED STATES PATENTS

| | | |
|---|---|---|
| 2,544,970 | Hornfeck | Mar. 13, 1951 |
| 2,802,976 | Brook | Aug. 13, 1957 |

OTHER REFERENCES

"Radio Engineering," Terman, McGraw-Hill Book Co., 1947, pp. 330 and 331.

"Servomechanism Practice," Ahrendt, McGraw-Hill Book Co., 1954, pp. 13 and 105.